(12) United States Patent
Merz et al.

(10) Patent No.: US 8,944,375 B2
(45) Date of Patent: Feb. 3, 2015

(54) LUGGAGE STORAGE COMPARTMENT FOR AN AIRCRAFT, AND AIRCRAFT COMPRISING THE LUGGAGE STORAGE COMPARTMENT

(71) Applicants: Simon Merz, Aalen-Wasseralfingen (DE); Michael Zinke, Postbauer-Heng (DE); Oleg Graf, Illertissen (DE); Max Failenschmid, Neu-Ulm (DE); Ulrich Evers, Ulm (DE); Annica Dieterich, Ulm (DE)

(72) Inventors: Simon Merz, Aalen-Wasseralfingen (DE); Michael Zinke, Postbauer-Heng (DE); Oleg Graf, Illertissen (DE); Max Failenschmid, Neu-Ulm (DE); Ulrich Evers, Ulm (DE); Annica Dieterich, Ulm (DE)

(73) Assignee: Diehl Aircabin GmbH, Laupheim (DE)

( * ) Notice: Subject to any disclaimer, the term of this patent is extended or adjusted under 35 U.S.C. 154(b) by 245 days.

(21) Appl. No.: 13/679,155

(22) Filed: Nov. 16, 2012

(65) Prior Publication Data

US 2013/0119199 A1    May 16, 2013

(30) Foreign Application Priority Data

Nov. 16, 2011  (DE) .......................... 10 2011 118 553

(51) Int. Cl.
*B64D 11/00*        (2006.01)
(52) U.S. Cl.
CPC ..................................... *B64D 11/003* (2013.01)
USPC ........................................ 244/118.5; 312/248
(58) Field of Classification Search
USPC ............ 244/118.1, 118.5; 312/245, 246, 247, 312/248
See application file for complete search history.

(56) References Cited

U.S. PATENT DOCUMENTS

| 5,441,218 | A | * | 8/1995 | Mueller et al. | ............. 244/118.1 |
| 5,456,529 | A | * | 10/1995 | Cheung | ......................... 312/245 |
| 5,820,076 | A | * | 10/1998 | Schumacher et al. | ..... 244/118.5 |
| 7,118,068 | B2 | * | 10/2006 | Graf et al. | .................. 244/118.5 |
| 7,143,977 | B2 | * | 12/2006 | Graf et al. | .................. 244/118.1 |
| 7,246,771 | B2 | * | 7/2007 | Wisch et al. | ................ 244/118.5 |
| 7,481,397 | B2 | * | 1/2009 | Steinbeck et al. | ......... 244/118.5 |
| 7,887,008 | B2 | | 2/2011 | Lamoree et al. | |
| 8,596,577 | B2 | * | 12/2013 | Berkenhoff et al. | ....... 244/118.1 |

FOREIGN PATENT DOCUMENTS

| DE | 10222125 A1 | 11/2003 |
| DE | 10361830 A1 | 8/2005 |
| DE | 10 2009 057 014 A1 | 9/2009 |

* cited by examiner

*Primary Examiner* — Tien Dinh
*Assistant Examiner* — Michael Kreiner
(74) *Attorney, Agent, or Firm* — Scully, Scott, Murphy & Presser P.C.

(57) ABSTRACT

Luggage storage compartment for an aircraft, comprising a housing and a luggage container being mounted pivotably in the housing about a pivot axis A, and being transferrable with a first pivoting motion S1 from a closed position G into an open position Ö and the luggage storage compartment being opened, and being transferrable with a second pivoting motion S2 from the open position Ö into the closed position G and the luggage storage compartment being closed, the luggage storage compartment having a pivoting apparatus, comprising a cable winding device with a winding roll and with a winding medium, the pivoting apparatus comprising a drive device with a drive motor for driving the winding roll, an axis of rotation D of the winding roll running in the same direction as and/or parallel to the pivot axis A of the luggage container.

16 Claims, 4 Drawing Sheets

LUGGAGE STORAGE COMPARTMENT FOR AN AIRCRAFT, AND AIRCRAFT COMPRISING THE LUGGAGE STORAGE COMPARTMENT

BACKGROUND OF THE INVENTION

The invention relates to a luggage storage compartment for an aircraft and to an aircraft comprising the luggage storage compartment.

DISCUSSION OF PRIOR ART

Luggage storage compartments are arranged in a cabin of a passenger aircraft so that passengers can stow items of luggage there, in particular hand luggage. The luggage storage compartments are often arranged in the overhead area of the passengers and are referred to extensively as "hatracks". A luggage storage compartment generally comprises a housing and a locker arranged pivotably therein. When the locker is pivoted out, the luggage storage compartment is opened and can be loaded with the items of luggage. By pivoting back the locker, the luggage storage compartment is closed, whereby the items of luggage are stowed securely therein. Luggage storage compartments that are opened and/or closed automatically by a pivoting motion by means of an electromechanical hybrid drive are already known from the prior art.

For example, document DE 10 2009 057 014 A1, which is the closest prior art, discloses an apparatus for closing a lowerable locker of a luggage compartment. The apparatus comprises an electric motor and a gas compression spring for driving two winding rolls, via which a first and second cable connected to the locker is guided. A gearing transfers a rotational speed of the electric motor to the cable winding apparatus, whereby the locker is opened and/or closed. The gearing also transfers the rotational speed of the electric motor to a toothed rack, whereby the toothed rack is displaced and the gas compression spring is biased.

SUMMARY OF THE INVENTION

The object of the invention is to propose a luggage storage compartment having an improved, space-saving pivoting apparatus. This object is achieved by a luggage storage compartment having the features of claim 1 and by an aircraft having the features of claim 15. Preferred or advantageous embodiments of the invention will emerge from the dependent claims, the following description and/or the accompanying figures.

A luggage storage compartment is proposed that is suitable and/or designed for an aircraft, in particular a passenger aircraft. The luggage storage compartment is preferably integratable in an aircraft cabin, and it is designed in particular to be installed in an overhead area above the passenger rows. The luggage storage compartment is preferably designed as a component or as a segment of what is known as a hatrack, or forms the hatrack.

The luggage storage compartment comprises a housing, which preferably has mechanical interfaces for fastening the luggage storage compartment in the aircraft cabin. In particular, the housing comprises at least two housing side walls and a housing upper side, wherein further luggage storage compartments or end regions of a luggage storage line preferably adjoin the two housing side walls. In a preferred embodiment, the luggage storage compartment, in particular the housing, is designed as a plastic part, in particular a plastic injection moulded part.

The luggage storage compartment further comprises a luggage container, which comprises a first and a second container side wall, a container base, a container front side and a container rear side. The luggage container is particularly preferably designed as a plastic part, in particular as a plastic injection moulded part. The luggage container is preferably designed as a locker, more specifically in the form of what is known as a pivot bin. In this function, the luggage container has a receiving opening, by means of which it can be loaded with items of luggage, in particular hand luggage.

The luggage container is mounted pivotably in the housing about a pivot axis. As a result of a first pivoting motion about the pivot axis, the luggage container can be transferred from a closed position into an open position. As a result of the first pivoting motion, the luggage storage compartment is opened, wherein the receiving opening of the luggage container is preferably released for loading with the items of luggage.

As a result of a second pivoting motion about the pivot axis, the luggage container can be transferred from the open position into the closed position, whereby the luggage storage compartment is closed and the items of luggage are stowed therein. The receiving opening preferably cannot be accessed in the closed position.

The luggage storage compartment comprises a pivoting apparatus, which is designed to transfer the luggage container into the open or closed position by execution of the first or second pivoting motion.

The pivoting apparatus comprises a cable winding device with a winding roll and with a winding medium, wherein the winding medium is preferably arranged on the winding roll, and in particular is wound up thereon. In particular, one end of the winding medium is connected to the winding roll and a different, free end is connected to the luggage container.

The pivoting apparatus comprises a drive device with a drive motor for driving the winding roll. A torque of the drive motor is preferably transferred to the winding roll, whereby the luggage container is opened or closed. In particular, the winding medium is unwound from the winding roll or is wound up on the winding roll depending on a direction of rotation of the winding roll.

The luggage container preferably executes the first pivoting motion when the winding medium is unwound from the winding roll, whereby said luggage container is transferred from the closed position into the open position and the luggage storage compartment is opened. In particular, the luggage container executes the second pivoting motion when the winding medium is wound up on the winding roll, whereby said luggage container is transferred from the open position into the closed position and the luggage storage compartment is closed.

The drive device preferably drives the winding roll at a constant speed so that the luggage storage compartment likewise executes the first or second pivoting motion at a constant speed.

The luggage storage compartment preferably comprises a locking device, by means of which the luggage container can be locked to the housing when the luggage storage compartment is closed. The locking device is preferably designed as an electromechanical lock.

The luggage storage compartment optionally comprises at least one operating device or is connectable or connected thereto. A user, for example a passenger or the cabin crew, can operate the luggage container, and in particular can unlock and trigger the implementation of pivoting motions, by means of the operating device. The luggage container preferably executes the first pivoting motion automatically and/or independently upon and/or after actuation of the operating device until it adopts the open position and the luggage storage compartment is completely opened. During the first pivoting motion, it is possible for the luggage container to be assisted by the force of gravity and, at the same time, to be transferred into the open position by the cable winding device.

Once the operating device has been actuated again by the user, the luggage container is automatically closed again by the drive of the drive device and the winding up of the winding medium on the winding roll. Advantageously, the user therefore does not have to exert any force, or only has to exert little force, to open or to close the luggage storage compartment. It is advantageous that the luggage storage compartment is designed in a very user-friendly manner and that comfort when loading the luggage storage compartment is increased.

In accordance with the invention, an axis of rotation of the winding roll runs in the same direction as and/or parallel to the pivot axis of the luggage container. Since the axis of rotation of the winding roll is arranged in the same direction as and/or parallel to the pivot axis of the luggage container, a very compact and space-saving construction of the pivoting apparatus is possible. In addition, the free end of the winding medium can advantageously be connected to the rear wall of the luggage container as a result of this arrangement. In particular, the free end engages at the point at which force can be transferred very effectively or even most effectively. This is particularly the case when the free end is fastened in the centre of the container rear wall (based on a longitudinal extension of the luggage container). It is particularly preferable for the free end to be connected to the rear wall side, which faces away from the aircraft cabin and is generally not visible to passengers.

In a preferred embodiment of the invention, the winding medium is designed as a belt made of a synthetic and/or textile material, in particular woven fabric. It is also possible for the winding medium to be designed as a band, for example as a steel band or as a synthetic band. In particular, the winding medium has a rectangular cross section having a very low height. More specifically, the winding medium is flat, wherein it has a height of 2 mm at most, preferably 1 mm at most, and in particular 0.5 mm at most.

It is advantageous for the winding medium, when designed as a belt or band, to have a relatively small radius of bend. In addition, due to the flat design and low height, the winding medium has a relatively low overall height when stacked on top of itself in the fully wound-up state. The winding roll can thus preferably have a relatively small diameter, which has a positive effect in particular on the spatial requirement with integration in the luggage storage compartment.

In a preferred embodiment of the invention, the drive motor is designed as an electric motor. To operate the electric motor, said motor is attached to a power supply or is connected or connectable thereto. The drive motor is preferably integrated into the pivoting apparatus and arranged on the luggage storage compartment such that a drive shaft of the drive motor extends in the same direction as and/or parallel to the pivot axis of the luggage container and in the same direction as and/or parallel to the axis of rotation of the winding roll.

In a further possible embodiment of the invention, the drive device comprises a gearing, for example a planetary gearing, for transferring a torque of the drive motor to the winding roll. Due to the transfer of the torque to the winding roll, the winding medium is preferably unwound from the winding roll and the luggage storage compartment is opened, or the winding medium is wound up and the luggage storage compartment is closed.

It is preferable if an output shaft of the gearing is connected to the winding roll via a mechanism. The mechanism optionally comprises at least one first and one second synchronous wheel and at least one toothed belt, which is guided via the two synchronous wheels. The mechanism preferably comprises a contrate gear pair with at least one first and one second contrate gear. In particular, the mechanism has a shaft, on which the second synchronous wheel, the first contrate gear and the winding roll are arranged in a rotationally engaged manner and/or rotate with the shaft. In particular, the shaft forms the axis of rotation of the winding roll, which runs in accordance with the invention in the same direction as and/or parallel to the pivot axis of the luggage container.

It is particularly preferable for the first synchronous wheel to be arranged on the output shaft of the gearing and to be connected thereto in a rotationally engaged manner, so that the first synchronous wheel rotates with the output shaft. The first synchronous wheel is connected to the second synchronous wheel via the toothed belt so that the second synchronous wheel rotates synchronously with the output shaft and the first synchronous wheel. Since the second synchronous wheel is connected to the shaft in a rotationally engaged manner, the torque is transferred via the shaft to the winding roll arranged thereon.

In one possible constructive embodiment of the invention, the first synchronous wheel has a smaller diameter than the second synchronous wheel. The second synchronous wheel preferably has a diameter approximately twice that of the first synchronous wheel. The winding roll optionally has a greater diameter than the first synchronous wheel and, at the same time, a smaller diameter than the second synchronous wheel.

In accordance with one possible embodiment of the invention, the drive device comprises a mechanically operating energy storage device, which is designed to store a kinetic energy produced during the first pivoting motion of the luggage container and to release it again during the second pivoting motion of the luggage container.

It is advantageous that a required energy or a power consumption of the drive motor to close the luggage storage compartment can be reduced by the energy release of the energy storage device.

For example, the energy storage device is designed as a gas compression spring. Alternatively, the energy storage device can be designed as any desired suitable working cylinder, for example as a hydraulic cylinder.

In one constructive embodiment of the invention, the pivoting apparatus and the drive device are attached to the luggage storage compartment such that the longitudinal extension of the energy storage device extends parallel to the pivot axis of the luggage container and parallel to the axis of rotation of the winding roll. In particular, the forward stroke or return stroke of a piston of the working cylinder, in particular of the gas compression spring, is implemented in the same direction as and/or parallel to the pivot axis and in the same direction as and/or parallel to the axis of rotation of the winding roll.

The piston preferably executes a forward stroke during the first pivoting motion of the luggage container, whereby a medium arranged in the working cylinder, for example gas in the gas compression cylinder, is compressed and the kinetic energy for executing the first pivoting motion is stored.

In a possible embodiment of the invention, the pivoting device comprises a toothed rack. The toothed rack is preferably displaced in a direction directed in the same direction as and/or parallel to the pivot axis when the luggage container executes the first pivoting motion. In particular, the gas compression spring is biased with the displacement of the toothed rack by movement of the piston in the forward stroke direction.

The toothed rack optionally comprises a sliding element to move the piston in the forward stroke direction. For example, the toothed rack is arranged on or above the sliding element and is connected thereto. The sliding element is preferably displaced together with the toothed rack, wherein the sliding element presses against the piston of the gas compression spring so that the piston executes the forward stroke and the gas compression spring is biased.

In a preferred embodiment of the invention, a gearing or the gearing, in particular the planetary gearing, is designed to transfer the torque of the drive motor to the toothed rack. The transferred torque is preferably transferred to the toothed rack via the mechanism, in particular via the contrate gear pair, whereby said toothed rack is displaced in the direction directed in the same direction as the pivot axis and/or parallel to the pivot axis, optionally together with the sliding element, and biases the gas compression spring.

The energy storage device preferably comprises a trigger unit, for example with a servomotor and a microswitch. It is particularly preferable for the trigger unit to be designed to activate or to deactivate the energy storage device selectively. In particular, the piston is blocked selectively against the return stroke in the cylinder, or is selectively released for the return stroke. The toothed rack is therefore moved back into its original position during the second pivoting motion of the luggage container, independently of the return stroke of the piston.

Once the piston has executed the forward stroke completely during the first pivoting motion of the luggage container and has reached an end position in the cylinder, the piston actuates the microswitch for example, whereupon the servomotor blocks the piston in the end position so that it cannot be released therefrom when the toothed rack returns back into its original position, optionally together with the sliding element, during the second pivoting motion of the luggage container. If necessary, for example with a high effective load of the luggage container, the servomotor releases the piston for the return stroke during the second pivoting motion of the luggage container for example, whereby the energy stored in the energy storage device is released and the second pivoting motion is assisted.

In a preferred embodiment of the invention, the luggage storage compartment comprises a control device or is connectable or connected thereto. The control device is preferably designed as a programmable logic controller (PLC). The control device optionally comprises an evaluation device for evaluating incoming electrical signals. For example, the control device is integrated decentrally on the luggage storage compartment or centrally in an aircraft control system.

In accordance with a possible embodiment of the invention, the energy storage device comprises a force transducer to detect a tensile and/or compressive force of the working cylinder, in particular of the gas compression spring. The evaluation device of the control device preferably establishes the effective load of the luggage container in accordance with the tensile and/or compressive force.

The control device particularly preferably actuates the energy storage device, particular the trigger unit, in accordance with the established effective load of the luggage container, to release the stored kinetic energy during the second pivoting motion of the luggage container. In particular, the control device actuates the servomotor of the trigger unit for example, in accordance with the established effective load of the luggage container, to release the piston for the return motion and to deliver the stored kinetic energy to assist the second pivoting motion.

The energy storage device is preferably not activated by the control device with an effective load less than a first effective load limit, for example of 25 kg, wherein the drive motor exclusively drives the luggage container.

With an effective load that is greater than the first effective load limit, for example with more than 25 kg, the control device actuates the activation of the energy storage device so as to assist the drive motor when driving the luggage container in the second pivoting motion. The energy storage device thus assists the drive motor in a software-controlled manner, in particular in accordance with the effective load.

In particular, the drive motor has to transfer less force to the luggage container as a result of the activation of the energy storage device during the second pivoting motion, whereby it can be operated advantageously in an energy-saving manner. It can further be ensured, even with non-uniform loading of a plurality of luggage storage compartments, that all luggage storage compartments can be opened or closed at equal and constant speed. In particular, a highly varying effective load of the luggage storage compartments does not have any influence on the pivoting motions of the luggage container.

If, however, an effective load greater than a second effective load limit of 50 kg for example is established, the luggage container is overloaded, In this case, the control device preferably stops the drive motor so that the luggage container remains open until the maximum permissible effective load is no longer exceeded. Overloading can thus be prevented and the drive motor is thus prevented from overheating or from being overloaded.

If the overload is rectified by the removal of luggage from the luggage container, the control device actuates the drive motor again, and optionally additionally the energy storage device, so as to close the luggage storage compartment.

By establishing the effective load by the force transducer, forgotten items of luggage in the luggage storage compartments of the aircraft can advantageously also be detected.

In a further possible embodiment of the invention, the drive apparatus comprises a position sensor, which is designed to detect an angle of rotation of the drive shaft of the drive motor. Alternatively, the position sensor can detect the angle of rotation of the output shaft of the gearing or a stroke distance of the piston of the working cylinder, in particular of the gas compression spring.

The measured angle of rotation or the measured stroke distance is preferably forwarded to the evaluation device, which calculates an opening angle of the luggage container from this information and conveys this to the control device. The control device actuates the drive motor in accordance with the opening angle to drive the luggage container with the first or second pivoting motion until said luggage container adopts exactly the open position or the closed position.

The position sensor may optionally be designed as an absolute rotary encoder or as incremental rotary encoder. Due to the design as an incremental rotary encoder, very accurate position values of the luggage container can be determined, in particular with a high speed of rotation of the drive motor. It is thus ensured that the luggage container can be transferred exactly into the open position or into the closed position. The locking device optionally additionally reports the complete locking of the control luggage storage compartment to the control device.

In one possible constructional embodiment of the invention, the luggage storage compartment has at least one sensor device in the form of a trap safeguard, which is preferably arranged at the closing edges of the housing and/or of the luggage container. The trap safeguard preferably identifies whether obstacles are located between the closing edges when the luggage container is closed. If an obstacle is identified, a signal is forwarded to the control device, which then stops the second pivoting motion of the luggage container until the obstacle has been eliminated and is no longer detected by the trap safeguard. In particular, the closing process is only continued once the obstacle has been eliminated and once the control device is given the all-clear by the trap safeguard. A risk of injury to the user, for example a risk of the user's fingers being trapped, can thus be minimized by the integration of the trap safeguard.

The operating device of the luggage storage compartment is preferably arranged in the form of a switch or button on the front side of the luggage container. For example, the user can unlock the luggage storage compartment by activating the operating device and can thus initiate the first pivoting motion. The luggage storage compartment can also be unlocked and/or opened manually if necessary, for example in the event of a power outage or failure of the mechanism.

The second pivoting motion is preferably initiated by renewed actuation of the operating device, and the luggage storage compartment is closed again and optionally locked. The second pivoting motion can alternatively also be triggered by a manual lifting of the luggage container. In this case, the control device actuates the drive motor if the luggage container is not located in the open position over a defined period of time and the drive motor has not yet been activated. Alternatively or optionally additionally, the control device activates the drive motor if a measured value of the tensile and/or compressive force in the working cylinder, detected by the force transducer, is equal to zero for a specific period of time, for example 0.5 seconds, or if the measured value is less than the previously detected measured value by a specific percentage, for example 30%.

Alternatively or optionally additionally, the operating device can be designed as a remote control, with which the cabin crew for example can control centrally a number of, or all, luggage storage compartments in the aircraft. This may be of advantage for example during take-off and/or landing procedures of the aircraft. It is also possible for the cabin crew to be able to control the luggage storage compartments in the aircraft separately or individually.

In a possible embodiment of the invention, the luggage storage compartment is connectable to a display device. Operating states, such as the open or closed position of the luggage storage compartment(s) in the aircraft, are preferably displayed by the display device. It is also particularly preferable for error messages, such as an overloading of the luggage container, a failure of mechanical and/or electrical components, incorrect operation, misuse by users, etc to be displayed on the display device.

In particular, the display on the display device is controlled by the control device.

It is preferable for the display device to be arranged in the area of responsibility of the cabin crew so as to convey the necessary information to them visually. It is also possible for the display device to be attached centrally on the luggage storage compartment so as to provide information to the user individually.

The display device is optionally designed as an information panel with a plurality of multi-coloured light-emitting diodes (LEDs). Alternatively, the display device can be designed as a screen or display, in particular as a liquid crystal display.

BRIEF DESCRIPTION OF THE DRAWINGS

Further features, advantages and effects of the invention will emerge from the following description of preferred exemplary embodiments of the invention, in which.

DETAILED DESCRIPTION OF THE INVENTION

Figure 1:
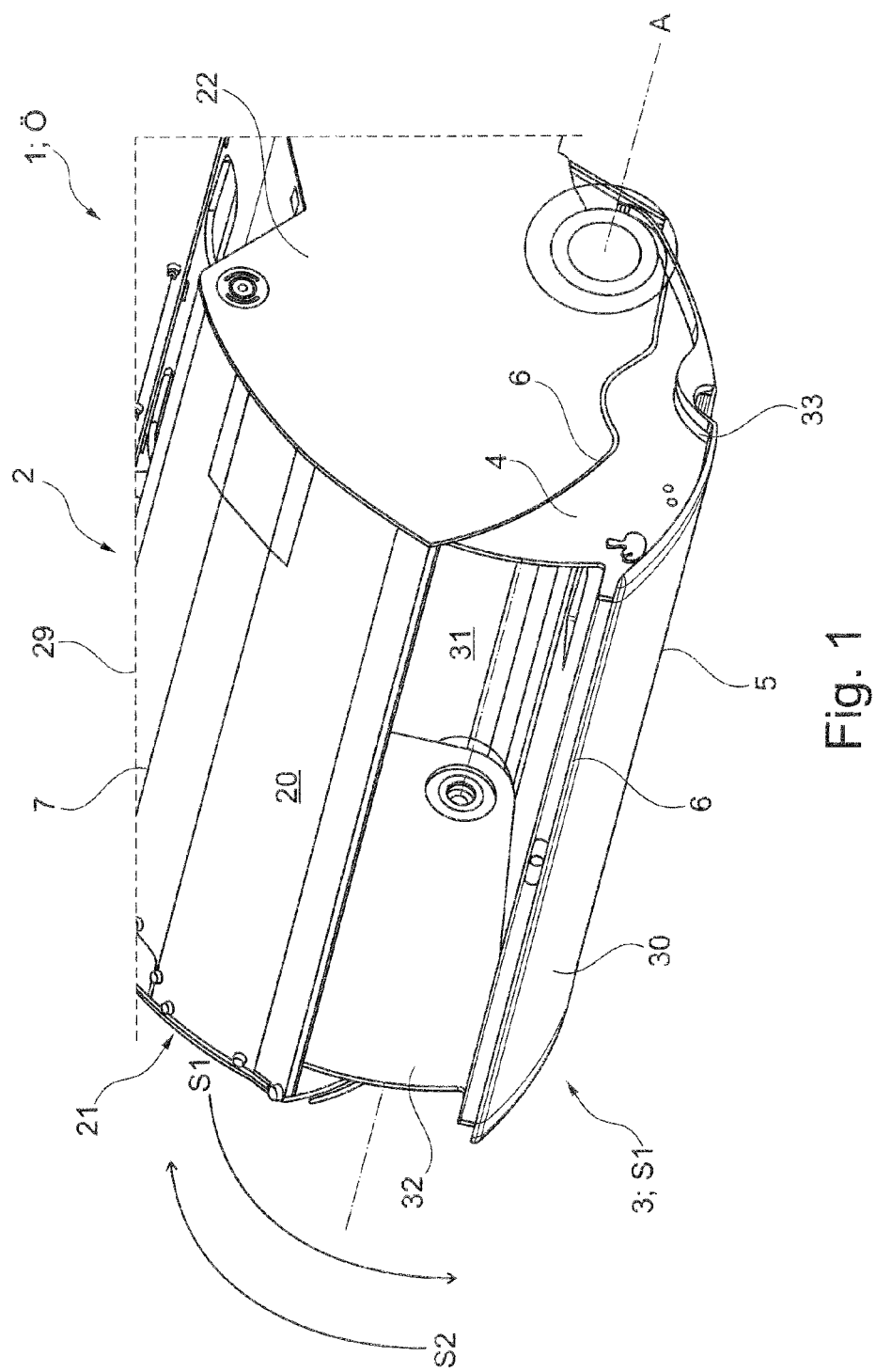
FIG. 1 shows a perspective view of a luggage storage compartment or a side row of seats in an aircraft.

A perspective view of a luggage storage compartment 1 is shown in FIG. 1 as one exemplary embodiment of the invention. The luggage storage compartment 1 is suitable and/or designed for integration in an aircraft, in particular in a passenger aircraft, in an overhead area of passengers. It is designed as a hatrack or as part of a hatrack.

The luggage storage compartment 1 has a housing 2 and a luggage container 3 arranged therein. The housing 2 has a housing upper side 20, two housing side walls 21; 22 and a housing rear side 23. The housing can be fastened, or is fastened, immovably to a wall of the aircraft.

The luggage container 3 is designed as a locker or as what is known as a pivot bin and is arranged in the housing 2 between the housing side walls 21; 22. The luggage container 3 comprises a container front side 30, a container rear side 31 and two container side walls 32; 33, which together enclose a receiving opening for items of luggage.

The container side walls 32; 33 are arranged adjacent to the housing side walls 21; 22 and run parallel thereto or approximately parallel thereto. The luggage container 3 is mounted pivotably in the housing 2 about a pivot axis A. The longitudinal extension of the pivot axis A intersects the housing side walls 21; 22 and the container side walls 32; 33.

As a result of a first pivoting motion S1 about the pivot axis A, the luggage container 3 is pivoted out from the housing 2 and adopts an open position Ö, whereby the luggage storage compartment 1 is opened. In the open position Ö, the receiving opening is released for loading by a passenger of the aircraft. FIG. 1 shows the opened luggage storage compartment 1 with the luggage container 3 in the open position Ö.

Figure 2:
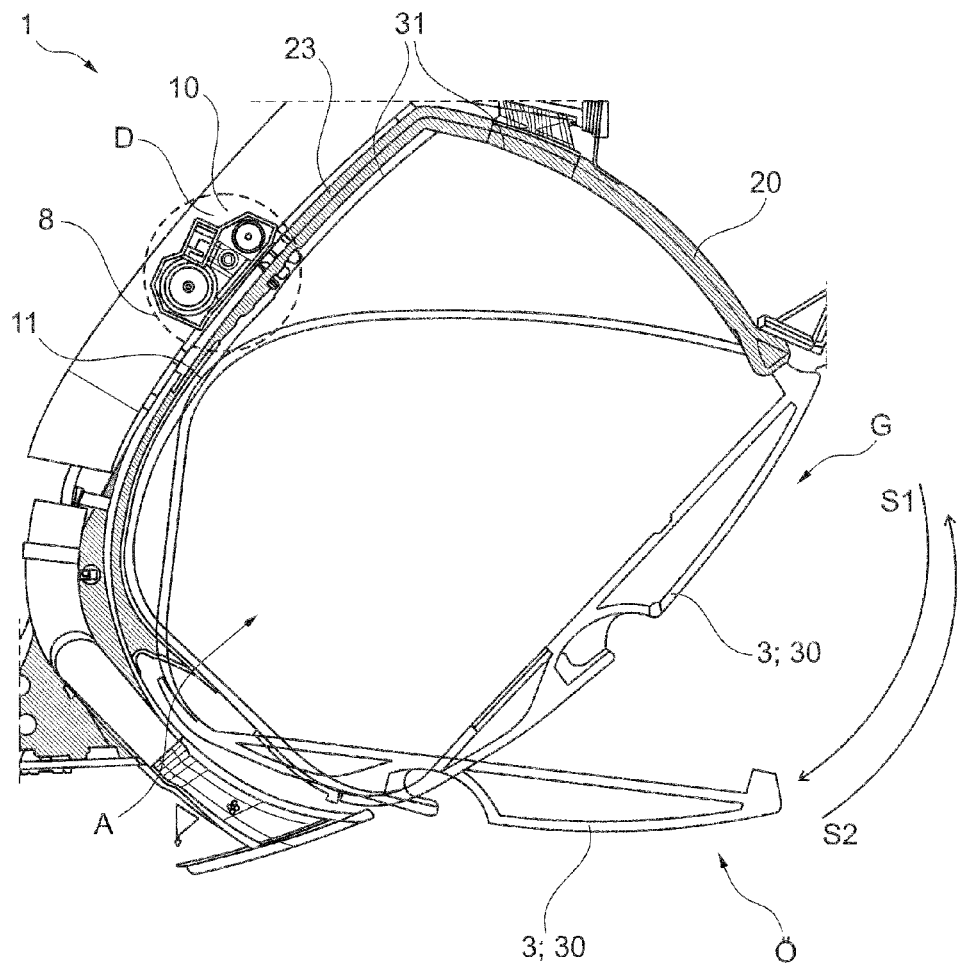
FIG. 2 shows a side view of the luggage storage compartment from FIG. 1.

As a result of a second pivoting motion S2, which is executed in a direction opposite to that of the first pivoting motion S1, the luggage container 3 is pivoted back into a closed position G shown in FIG. 2 and the luggage storage compartment 1 is closed. In the closed position G, the receiving opening is covered by the housing upper side 20 and is not visible to and/or accessible by the passenger.

The luggage storage compartment 1 has a locking device 4, with which the luggage container 3 can be locked in the housing 2. In the locked state, the luggage storage compartment 1 cannot pivot out from the housing 2 by itself. The locking device 4 is designed as an electromechanical lock. The luggage storage compartment 1 comprises an operating device 5, which is arranged in the form of a button or switch on the container front side 30 for example. When the operating device 5 is actuated manually by the passenger, the locking device 4 is unlocked so that the luggage storage compartment 1 can be opened.

Alternatively or optionally additionally, the operating device 5 may be designed as a remote control, with which the locking device 4 can be locked or unlocked remotely. In this case, it is possible for example for a flight crew or a cabin crew to lock or release all luggage storage compartments arranged in the aircraft simultaneously and to thus operate these centrally. Each individual luggage storage compartment 1 can also be controlled individually.

The luggage storage compartment 1 comprises a trap safeguard 6, which extends along a closing edge of the housing 2 and/or of the luggage container 3. The trap safeguard 6 is designed as a sensor device to detect an obstacle between a closing edge of the luggage container 3 and the closing edge of the housing 2, for example caused by a passenger's fingers being clamped.

The luggage storage compartment 1 further comprises a control device 7, for example a programmable logic controller (PLC), with an evaluation device (not shown) for evaluating incoming electrical signals. The luggage storage compartment 1 can also be connected or is connectable to the control device 7. The control device 7 is arranged on the housing 2 of the luggage storage compartment 1 or is connected thereto. Alternatively, the control device 7 can also be arranged centrally in the aircraft control system.

A large number of error sources, which take effect in the case of abnormal operation of the luggage storage compartment 1, are taken into account in the programming of the control device 7. Possible abnormal events include, for example, failure of electronic/mechanical components, incorrect operation/misuse by users, clamping of objects, etc. Such error sources, as well as different operating states and/or warning displays of the luggage storage compartment 1 however, can be displayed on a display device 29 that is connectable or connected to the luggage storage compartment 1. The display device 29 is arranged in the area of responsibility of the cabin crew and/or directly on the luggage storage compartment 1 for example, so that the user of the luggage storage compartment 1 can be informed of the operating state.

FIG. 2 shows a side view of the luggage storage compartment 1 from FIG. 1. The luggage container 3 is illustrated in the closed position G, in which the luggage storage compartment 1 is closed. As a result of the first pivoting motion S1, the luggage storage compartment 1 is opened and the luggage container 3 is transferred into the open position Ö. The open position Ö of the luggage container is illustrated by dashed lines.

The luggage storage compartment 1 comprises a pivoting apparatus 8, which is arranged on the housing rear wall 23. The pivoting apparatus 8 is designed to pivot the luggage container 3 and to automatically and independently transfer the luggage container 3 into the open or closed position Ö; G.

Figure 3:
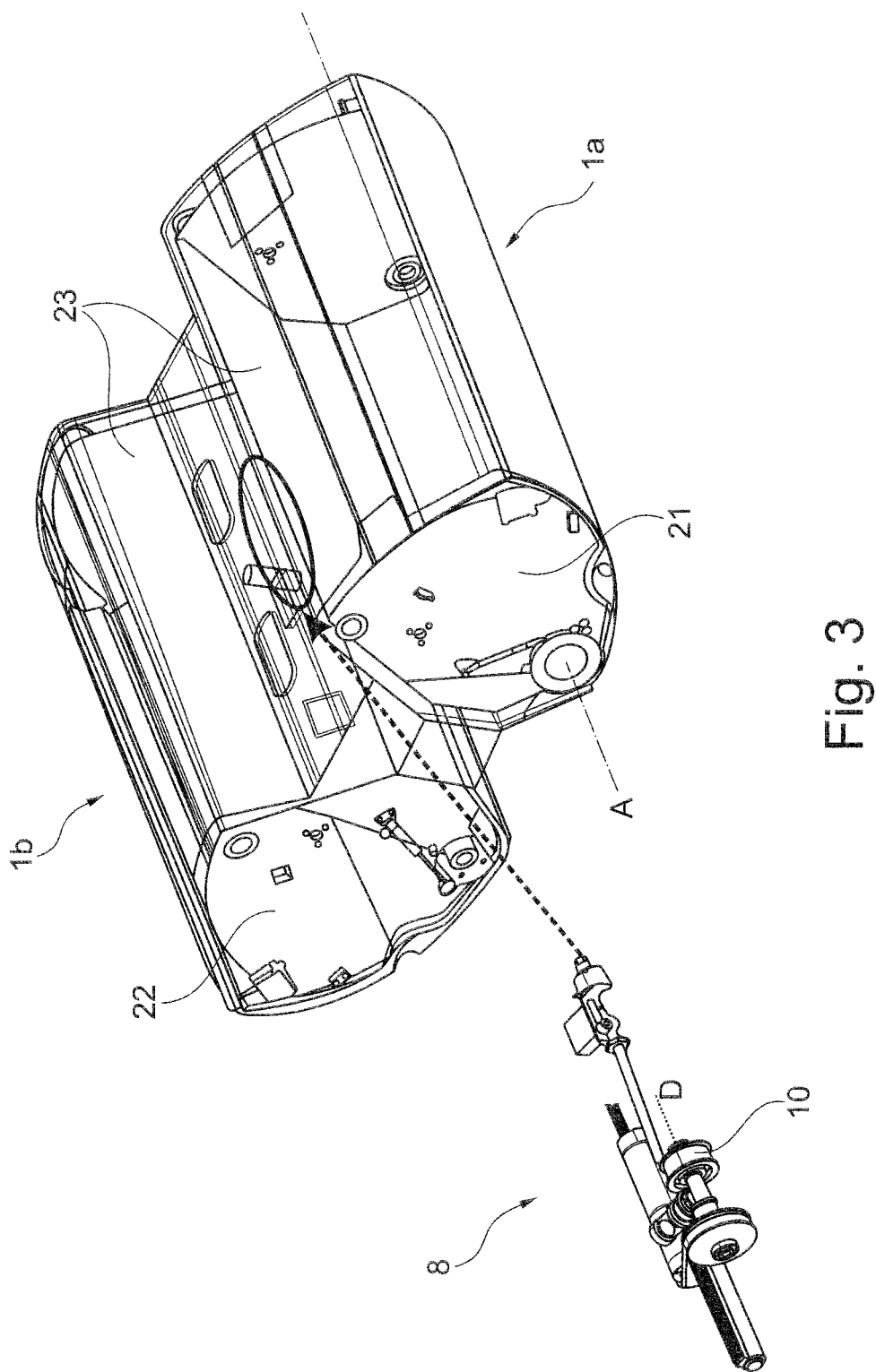
FIG. 3 shows two luggage storage compartments for a central o of seats in the aircraft from FIG. 1.

Two luggage storage compartments 1a; 1b are shown in FIG. 3, as are arranged relative to one another above the central row of seats in an aircraft cabin for example. The two luggage storage compartments 1a; 1b are arranged such that the housing rear walls 23 thereof are directed toward one another.

A preferred point at which the pivoting apparatus 8 can be arranged is illustrated by a dashed arrow directed from the pivoting apparatus 8 to the housing rear wall 23 of the first luggage storage compartment 1a. It is preferable for all luggage storage compartments 1a; 1b arranged in the aircraft to have the pivoting apparatus 8.

Figure 4:
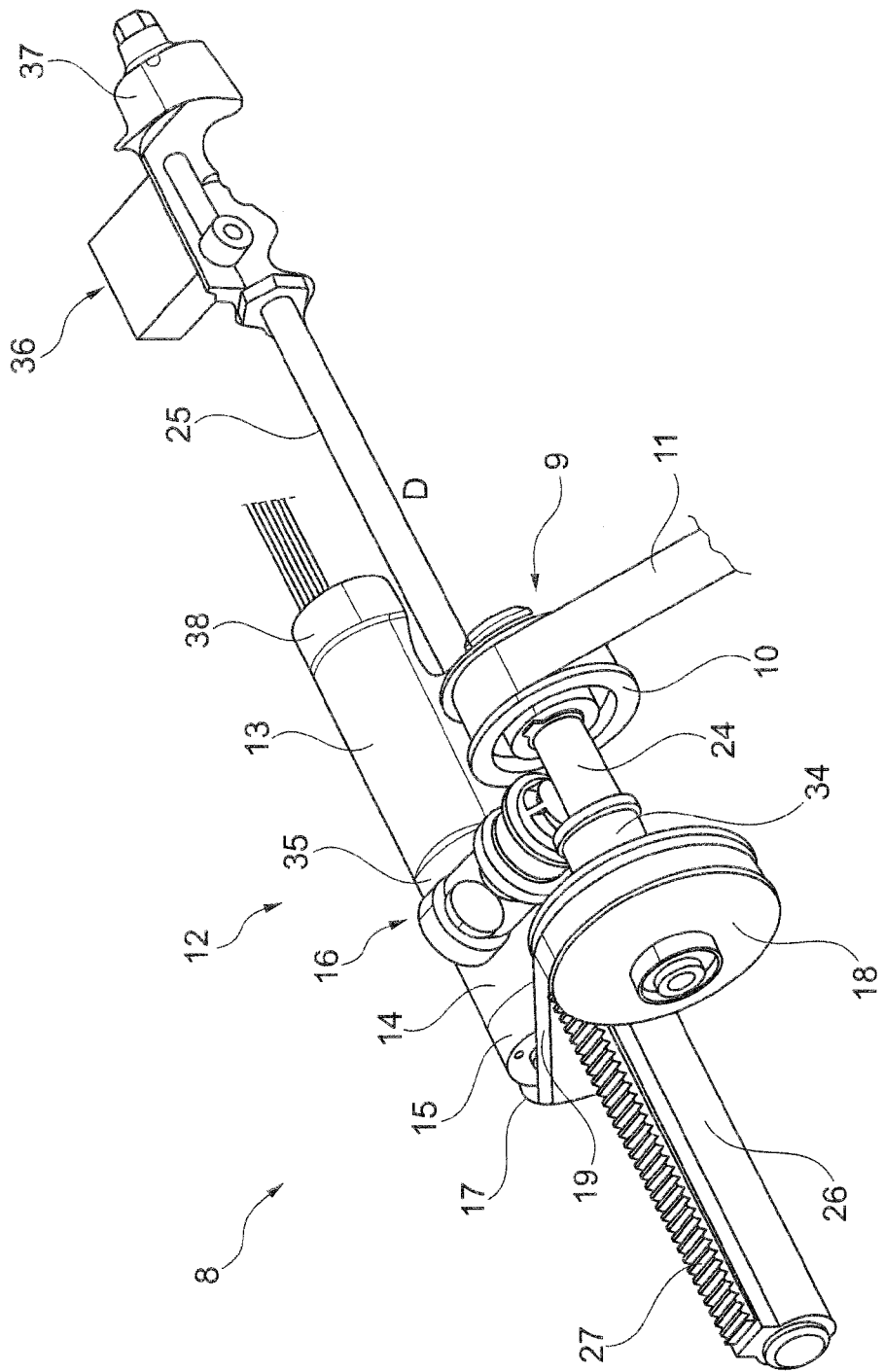
FIG. 4 shows a pivoting apparatus of the luggage storage compartment from FIGS. 1 to 3.

The pivoting device 8 is shown in an enlarged manner in FIG. 4. The pivoting apparatus 8 comprises a cable winding device 9 with a winding roll 10, on which a winding medium 11 is arranged. The winding medium 11 is designed as a flat belt or as a flat band, in particular a steel band, having a height of 2 mm at most, preferably less, and is fastened at one end to the winding roll 11. At a different, free end, the winding medium 11 is connected to the luggage container 3.

When the pivoting apparatus 8 is installed in the luggage storage compartment 1 in accordance with FIGS. 2 and 3, an axis of rotation D of the winding roll 10 is directed in the same direction as the pivot axis A of the luggage container 3 or parallel thereto.

In FIG. 2, the axis of rotation D of the winding roll 10 and the pivot axis A of the luggage container 3 are directed out from the image plane. The free end of the winding medium 11 wound up on the winding roll 10 is connected to the container rear wall 31. The winding medium 11 is guided through a recess in the housing rear wall 23 to a rear side of the container rear wall 31, wherein the rear side faces away from the aircraft cabin and is not visible to the passenger. In particular, the free end of the winding medium 11 is fastened centrally to the container rear wall 31 in a longitudinal extension of the luggage container 3. Force can thus be transferred effectively between the cable winding device 9 and the luggage container 3.

According to FIG. 4, the pivoting apparatus 8 comprises a drive device 12 with a drive motor 13 for driving the cable winding device 9. The drive motor 13 is designed as an electric motor. A drive shaft of the drive motor 13 is directed in the same direction as or parallel to the axis of rotation D of the winding roll 10 and therefore also in the same direction as or parallel to the pivot axis A (FIGS. 2 and 3).

The drive device 12 comprises a gearing 14, in particular a planetary gearing, for transferring a torque of the drive motor 13 to the winding roll 10. As a result of the transfer of the torque to the winding roll 10, said winding roll is turned and the winding medium 11 is unwound from the winding roll 10 or is wound up on the winding roll in accordance with a direction of rotation.

If the winding medium 11 is unwound from the winding roll 10, the luggage container 3 executes the first pivoting motion S1 (FIG. 1), whereby the luggage storage compartment 1 is opened. If the winding medium 11 is wound up on the winding roll 10, the luggage container thus executes the second pivoting motion S2 (FIG. 1), whereby the luggage storage compartment 1 is closed.

A drive shaft 15 of the gearing 14, which is likewise directed in the same direction as and/or parallel to the axis of rotation D of the winding roll 10, is connected to the winding roll 10 via a mechanism 16 of the pivoting apparatus 8.

The mechanism 16 comprises a first and a second synchronous wheel 17; 18, via which a toothed belt 19 is guided and which are interconnected by the toothed belt 19. The first synchronous wheel 17 has a diameter approximately half the size of that of the second synchronous wheel 18.

The first synchronous wheel 17 is connected in a rotationally engaged manner to the drive shaft 15, so that it turns with said drive shaft. Due to the toothed belt 19, the torque of the drive shaft 15 is transferred from the first synchronous wheel 17 to the second synchronous wheel 18.

The second synchronous wheel 18 is mounted in a rotationally engaged manner on a shaft 24, whereby the torque of the drive shaft 15 is transferred to the shaft 24. The winding roll 10 is also mounted in a rotationally engaged manner on the shaft 24, so that the shaft 24 forms the axis of rotation D of the winding roll 10 and the winding roll 10 turns as a result of the transferred torque of the drive shaft 15. The winding roll 10 has a diameter that is greater than the diameter of the first synchronous wheel 17 and smaller than the diameter of the second synchronous wheel 18.

The drive device 12 comprises an energy storage device 25, which is designed to assist the second pivoting motion S2 of the luggage container 3 and to relieve the drive motor 13 when driving the luggage container 3 during the second pivoting motion S2.

The energy storage device 25 is designed as a working cylinder, in particular a gas compression spring, with a piston. The longitudinal extension of the energy storage device 25, in particular the direction of a forward stroke or return stroke of the working cylinder, is directed in the same direction as and/or parallel to the axis of rotation D of the winding roll 10 and therefore also in the same direction as and/or parallel to the pivot axis A of the luggage container 3 (FIGS. 1 to 3).

The energy storage device 25 stores a kinetic energy produced during the first pivoting motion S1 of the luggage container 3 (FIG. 1) and redelivers it during the second pivoting motion S2. The power consumption of the drive motor 13 can thus be reduced, in particular with a heavy load of the luggage container 3.

To move the piston into the working cylinder, in particular to execute a forward stroke of the piston when executing the first pivoting motion Si of the luggage container 3 (FIG. 1), the pivoting apparatus 8 comprises a toothed rack 27 arranged on a sliding element 26. The sliding element 26 is designed as a sliding sleeve in the illustration in FIG. 4.

The gearing 14 is designed to transfer the torque of the drive motor 13 to the toothed rack 27. To this end, the drive shaft 15 of the gearing is connected to the toothed rack 27 via the synchronous wheels 17; 18 and via a contrate gear pair.

The contrate gear pair comprises a first and a second contrate gear 34; 35, wherein the first contrate gear 34 is arranged on the shaft 24 in a rotationally engaged manner and turns with said shaft. The first contrate gear 34 transfers the torque of the shall 24 to the second contrate gear 35, which in turn transfers the torque to the toothed rack 27.

As a result of the transfer of the torque to the toothed rack 27, said toothed rack moves together with the sliding element 26 in the direction of the energy storage device 25. In doing so, the sliding element 26 exerts pressure onto the piston of the working cylinder so that said piston executes the forward stroke in the working cylinder.

If the energy storage device 25 is designed as a gas compression spring, this is biased by the forward stroke of the piston, wherein a medium located in the cylinder, in particular gas, is compressed and the kinetic energy is thus stored.

The energy storage device 25 comprises a trigger unit 36 with a servomotor and a microswitch. Once the piston has reached its end position in the cylinder, it thus actuates the microswitch and activates the servomotor, The servomotor blocks the piston in the end position so that it does not release from this position and the kinetic energy remains stored when the toothed rack 27, together with the sliding element 26, moves back into its original position during the second pivoting motion (S2) of the luggage container 3.

In particular, the trigger unit (36) is designed to block the piston selectively in the end position against the return stroke, for example in accordance with an effective load of the luggage container 3, or to release the piston for the return stroke and to assist the second pivoting motion as a result of the release of the kinetic energy.

The energy storage device 25 further comprises a force transducer, which measures a tensile and/or compressive force of the working cylinder, in particular of the gas compression spring. The measured results are forwarded by signals to the evaluation device of the control device 7 (FIG. 1) for evaluation.

The evaluation device calculates the effective load of the items of luggage in the luggage container 3 on the basis of the tensile and/or compressive force. The control device 7 controls the rotational speed of the drive motor 13 on the basis of the obtained data concerning the effective load so that the luggage storage compartment 1 is closed at constant speed, even when loaded heavily.

The control device 7 alternatively or optionally additionally activates the energy storage device 25 in accordance with the calculated effective load. In doing so, the control device 7 actuates the servomotor of the trigger unit to release the piston for the return stroke in the cylinder and to thus deliver the stored energy during the second pivoting motion S2 of the luggage container 3 (FIG. 1), to thus assist the second pivoting motion S2, and to relieve the drive motor 13.

For example, the energy storage device 25 is activated with an established effective load of >25 kg, whilst the drive power for executing the second closing motion S2 in particular is applied merely by the drive motor 13 with an effective load of <25 kg.

With an effective load of 50 kg, the maximum effective load of the luggage container 3 is reached. If it is established that the maximum effective load has been exceeded, the control device 7 thus actuates the emission of an error indication, for example to the display device 30. Optionally additionally, the control device 26 stops the drive of the luggage container 3 by the drive motor 17 and, where applicable, also the optionally activated energy storage device 28.

The drive apparatus 16 comprises a position sensor 38, which is designed for example as an absolute rotary encoder or as an incremental rotary encoder to detect an angle of rotation of the drive shaft of the drive motor 13. Alternatively, the position sensor 38 detects a stroke distance of the piston in the working cylinder. The measured angle of rotation or the measured stroke distance is forwarded to the evaluation device for evaluation, whereby an opening or closing angle of the luggage container 3 (FIG. 1) is calculated.

The control device 26 controls the drive device 12, in accordance with the calculated opening or closing angle, to drive the luggage container 3 until it has reached exactly the open or closed position Ö; G. The locking device 4, which transmits an electrical signal to the control device 7 indicating that the luggage storage compartment 1 is closed completely, is used as an end stop in the closed position G (see also FIGS. 1 and 2).

If the trap safeguard 6 detects an obstacle, for example a passenger's hand, between the closing edges of the luggage storage compartment 1 during the closing process, it reports this to the control device 7 via a corresponding signal. When it receives the signal, the control device stops the second pivoting motion S2 of the luggage container 3 by deactivating the drive apparatus 12 and optionally additionally the energy storage device 25. A risk of injury to the passengers can thus be reduced. As soon as the obstacle is removed or eliminated, the control device 7 re-starts the drive apparatus 12, whereby the second pivoting motion S2 is continued and the luggage storage compartment 1 is closed (FIGS. 1; 2).

LIST OF REFERENCE SIGNS

1 luggage storage compartment
2 housing
3 luggage container
4 locking device
5 operating device
6 trap safeguard
7 control device
8 pivoting apparatus
9 cable winding device
10 winding roll
11 winding medium 12 drive device
13 drive motor
14 gearing
15 output shaft
16 mechanism
17 first synchronous wheel
18 second synchronous wheel
19 toothed belt
20 housing upper side
21 first housing side wall
22 second housing side wall
23 housing rear wall
24 shaft
25 energy storage device
26 sliding element
27 toothed rack
28 contrate gear pair
29 display device
30 container front side
31 container rear wall
32 first container side wall
33 second container side wall
34 first contrate gear
35 second contrate gear
36 trigger unit
37 force transducer
38 position sensor

What is claimed is:

1. A luggage storage compartment for an aircraft, comprising a housing and a luggage container,
the luggage container being mounted pivotably in the housing about a pivot axis, the luggage container being transferrable with a first pivoting motion from a closed position into an open position to open the luggage storage compartment, and the luggage container being transferrable with a second pivoting motion from the open position into the closed position to close the luggage storage compartment,
the luggage storage compartment having a pivoting apparatus, wherein said pivoting apparatus is configured to transfer the luggage container into the open position by execution of the first pivoting motion and transfer the luggage container into the closed position by execution of the second pivoting motion,
the pivoting apparatus comprising a cable winding device with a winding roll and with a winding medium, the pivoting apparatus comprising a drive device with a drive motor for driving the winding roll, wherein an axis of rotation of the winding roll runs in the same direction as the pivot axis of the luggage container or parallel to the pivot axis of the luggage container,
wherein the drive device comprises an energy storage device configured to store a kinetic energy produced during the first pivoting motion of the luggage container and to release the kinetic energy during the second pivoting motion of the luggage container so that a required power of the drive motor to close the luggage storage compartment is reduced, and
wherein said energy storage device comprises a gas compression spring.

2. The luggage storage compartment according to claim 1, wherein a free end of the winding medium is fastened to a rear wall of the luggage container.

3. The luggage storage compartment according to claim 1, wherein the winding medium comprises at least one of a belt or band.

4. The luggage storage compartment according to claim 1, wherein:
a drive shaft of the drive motor extends in the same direction as the pivot axis or parallel to the pivot axis; and
the drive shaft extends in the same direction as the axis of rotation of the winding roll or parallel to the axis of rotation of the winding roll.

5. The luggage storage compartment according to claim 1, wherein the drive device comprises a gearing for transferring a torque of the drive motor to the winding roll, such that, when the winding medium is wound up on the winding roll, the luggage storage compartment is opened, and when the winding medium is unwound from the winding roll, the luggage storage compartment is closed.

6. The luggage storage compartment according to claim 5, wherein the gearing comprises a planetary gearing.

7. The luggage storage compartment according claim 1, wherein:
the longitudinal extension of the energy storage device extends in the same direction as the pivot axis of the luggage container or parallel to the pivot axis of the luggage container; and
the longitudinal extension of the energy storage device extends in the same direction as the axis of rotation of the winding roll or parallel to the axis of rotation of the winding roll.

8. The luggage storage compartment according to claim 1, wherein the pivoting device comprises a toothed rack, the gas compression spring being biased with a displacement of the toothed rack directed in the same direction as the pivot axis of the luggage container or parallel to the pivot axis of the luggage container.

9. The luggage storage compartment according to claim 8, wherein a gearing is configured to transfer the torque of the drive motor to the toothed rack, wherein said toothed rack is displaced in a direction same as the pivot axis or parallel to the pivot axis.

10. The luggage storage compartment according to claim 8, wherein the energy storage device comprises a trigger unit
wherein the trigger unit is configured to selectively block a piston of the gas compression spring against a return stroke such that the gas compression spring remains biased when the toothed rack moves back with the second pivoting motion of the luggage container, or configured to selectively release said piston for the return stroke such that the gas compression spring is relaxed and the kinetic energy is released.

11. The luggage storage compartment according to claim 10, wherein the luggage storage compartment comprises a control device with an evaluation device.

12. The luggage storage compartment according to claim 11, wherein said control device comprises a programmable logic controller (PLC).

13. The luggage storage compartment according to claim 11, wherein the energy storage device comprises a force transducer to detect at least one of a tensile force and a compressive force of the gas compression spring, the evaluation device establishing an effective load of the luggage container in accordance with the at least one of the tensile force and the compressive force.

14. The luggage storage compartment according to claim 11, wherein the control device actuates the trigger unit, in accordance with an established effective load of the luggage container, to release the stored kinetic energy during the second pivoting motion of the luggage container and to thus assist the second pivoting motion.

15. The luggage storage compartment according to claim 11, wherein the drive apparatus comprises a position sensor, which is configured to detect an angle of rotation of a drive shaft of the drive motor or a stroke distance of a piston of the gas compression spring,
- wherein the evaluation device establishes an opening angle of the luggage container in accordance with the angle of rotation; and the control device actuates the drive device, in accordance with the opening angle, to drive the luggage container with the first pivoting motion until said luggage container adopts exactly the open position; and
- wherein the evaluation device establishes a closing angle of the luggage container in accordance with the stroke distance; and the control device actuates the drive device, in accordance with the closing angle, to drive the luggage container with the second pivoting motion until said luggage container adopts exactly the closed position.

16. An aircraft, comprising the luggage storage compartment according to claim 1.

* * * * *